D. L. SCHUBERT 2,665,633

PANEL BRANDER

Filed Nov. 21, 1947

INVENTOR.
Dale L. Schubert
BY
Arnold and Mathis
ATTORNEYS

Jan. 12, 1954     D. L. SCHUBERT     2,665,633
PANEL BRANDER

Filed Nov. 21, 1947     7 Sheets-Sheet 3

INVENTOR.
Dale L. Schubert
BY
Arnold and Mathis
ATTORNEYS

Jan. 12, 1954    D. L. SCHUBERT    2,665,633
PANEL BRANDER

Filed Nov. 21, 1947    7 Sheets-Sheet 4

INVENTOR.
Dale L. Schubert
BY
Arnold and Mathis
ATTORNEYS

Jan. 12, 1954　　　　　D. L. SCHUBERT　　　　　2,665,633
PANEL BRANDER

Filed Nov. 21, 1947　　　　　　　　　　　　7 Sheets-Sheet 5

INVENTOR.
Dale L. Schubert
BY
Arnold & Mathis
ATTORNEYS

Jan. 12, 1954

D. L. SCHUBERT

2,665,633

PANEL BRANDER

Filed Nov. 21, 1947

INVENTOR.
Dale L. Schubert
BY
Arnold and Mathis
ATTORNEYS

Patented Jan. 12, 1954

2,665,633

UNITED STATES PATENT OFFICE 2,665,633

PANEL BRANDER

Dale L. Schubert, Tacoma, Wash., assignor to Plywood Research Foundation, Tacoma, Wash., a corporation of Washington Application November 21, 1947, Serial No. 787,395

1 Claim. (Cl. 101—11)

My invention relates to a panel brander and stacker. By way of illustration and not as a limitation, my invention will be described in connection with a brander and stacker for plywood panels.

Heretofore plywood panels were individually branded to indicate various information, such as name of manufacturer, the type of glue employed in bonding the plies of the panel together, and grade. This prior art practice required considerable hand labor and the panels were not uniformly branded.

It is an object of my invention to provide a brander wherein panels are automatically and uniformly branded.

It is a further object of my invention to provide a brander wherein a stack of panels is elevated and the uppermost panels are consecutively removed and urged past brander means.

It is an object of my invention to provide adjusting means so that the brander and stacker of my invention can accommodate different size panels as to length, width, and thickness.

It is a further object of my invention to provide elevator means of a character so that one panel at a time is fed through the machine even though the panels of a given size vary in thickness within commercial tolerances.

It is a further object of my invention to provide a feeder for my brander-stacker of a character so that once the feed is started, the apparatus will continue through a cycle until a stack of panels is exhausted and then the feeder means will move to a position to receive a new stack of panels.

It is a further object of my invention to provide a stacker so that branded panels will be stacked before delivery from my device.

It is a further object of my invention to provide for automatic and uniform branding of the edges of a panel both vertically and longitudinally considered.

It is a further object of my invention to provide central control means so that all parts of the device will be adjusted simultaneously for a given dimension such as length, width, or thickness.

The above mentioned general objects of my invention, together with others inherent in the same, are attained by the device illustrated in the accompanying drawings throughout which like reference numerals indicate like parts:

Figure 1:
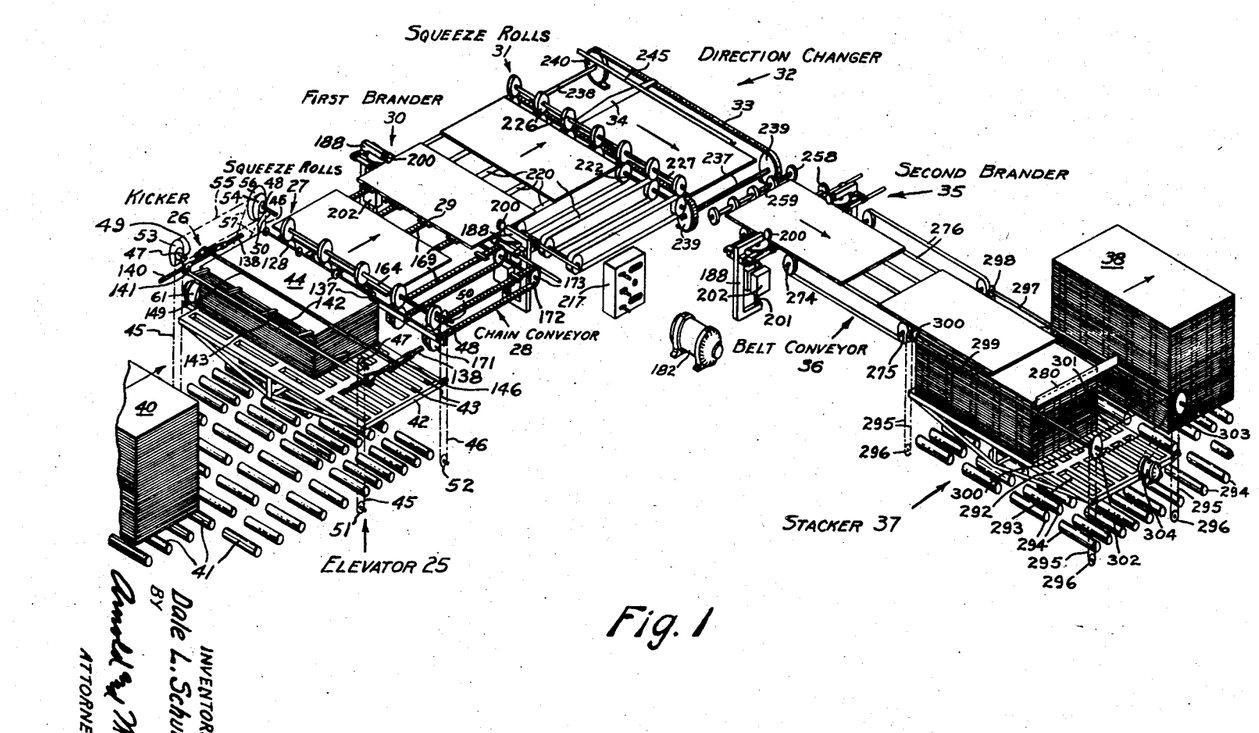
Figure 1 is a perspective and somewhat schematic view with many parts omitted to primarily correlate the various mechanisms involved in my invention.

Referring to Fig. 1 of the drawings, parts are shown somewhat schematically and other parts are broken away.

This figure functions to correlate the several parts of the invention and hence names of the parts, as well as the general numbers, are indicated to aid in correlation.

An elevator numbered generally as 25 functions to receive stacks of sheet material, as plywood, and to elevate the stack of sheets so that the sheets can be consecutively removed from the top of the stack. The means to consecutively remove the top sheet includes the kicker means 26 numbered generally 26 which has reciprocating means to urge the top sheet sufficiently so that its movement is controlled by the squeeze rolls numbered generally 27. The squeeze rolls 27 urge a sheet of material onto a conveyor means, as chain conveyor numbered generally 28. The chain conveyor is provided with cleats 29 thereon to engage the trailing edge of each piece. The conveyor 28 and the kicker means 26 are in timed relation. The control means for the elevator 25 is such as to always present one sheet of material to be urged by the kicker means 26 on each stroke thereof regardless of the thickness or the other dimensions of the sheets of material in the stack, provided of course that the stack is not exhausted. The conveyor 28 urges each sheet of material past edge branders which are numbered generally 30. These branders 30 may be termed "first brander." The first brander 30 is in timed relation to the chain conveyor 28, and in turn, the cleats 29 thereon, and thus an edge brand will always start in predetermined relation to the trailing edge of a piece of material determined by a dimension, as the width, of said piece of material. Thus, when pieces of material of the same dimension are branded and stacked, the brands will be vertically alined.

After sheets of material pass the brander 30 they encounter squeeze rolls, numbered generally 31, to be delivered onto a direction changer numbered generally 32. The direction changer 32 comprises generally a chain conveyor 33 with slats 34 thereon. The conveyor 33 travels in timed relation to the conveyor 28 and thus each sheet of material delivered from conveyor 28 to the conveyor 33 will be delivered just previous to the presentation of a slat 34 which will engage one edge of a sheet of material and change the direction of travel thereof as indicated by the arrows.

Next, the sheets of material are urged past a second brander numbered generally 35 and are supported during branding by a belt conveyor numbered generally 36. For substantially all of their travel past the second brander 35, the sheets are consecutively urged by slats 34. The conveyor 33 is driven in timed relation to the second brander 35, and thus as the slats 34 urge sheets of material past the brander 35, there is a definite relation between the brands on the edges of the sheets caused by the second brander 35 and the length of the sheets. Thus, when sheets of a common length are stacked, there will be a vertical alinement of the brands caused by the second brander 35.

As sheets are delivered off of conveyor 36, they are stacked by a stacker numbered generally 37. After a stack of suitable height is made, a unit comprising a stack of branded sheet material, as branded plywood, and numbered generally 38 is removed from the stacker.

The construction illustrated is provided with several adjustments controlled at a single station and there will be three major adjustments for: first, length of the sheets of material, second, width of the sheets of material, and third, the thickness of sheets of material.

The several details of the general assembly previously described will be set forth under the several titles mentioned and the titles will function as means to correlate the details to the assembly description just given but not as a limitation of the several parts. Also, the sheets of material being processed will be referred to as panels for illustrative purposes.

*Elevator 25*

Figures 2, 3, 19:
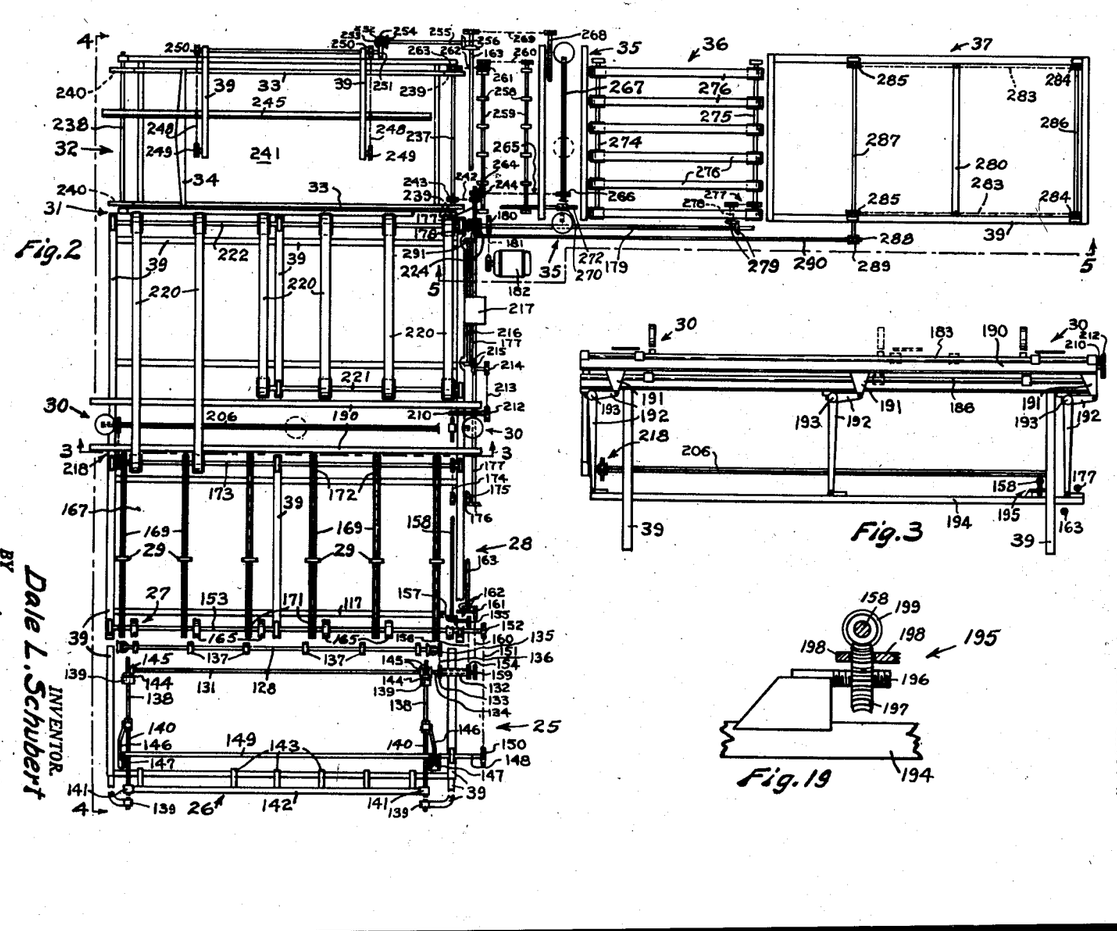
Fig. 2 is a plan view, with parts diagrammatically shown, with parts broken away, and with parts omitted of the structure shown in Fig. 1.
Fig. 3 is an elevational view taken substantially on broken line 3—3 of Fig. 2 with parts broken away, and with parts removed.
Fig. 19 is a fragmentary elevational view of parts shown at the lower right hand corner of Fig. 3 and on a larger scale than said Fig. 3.
Figure 4:
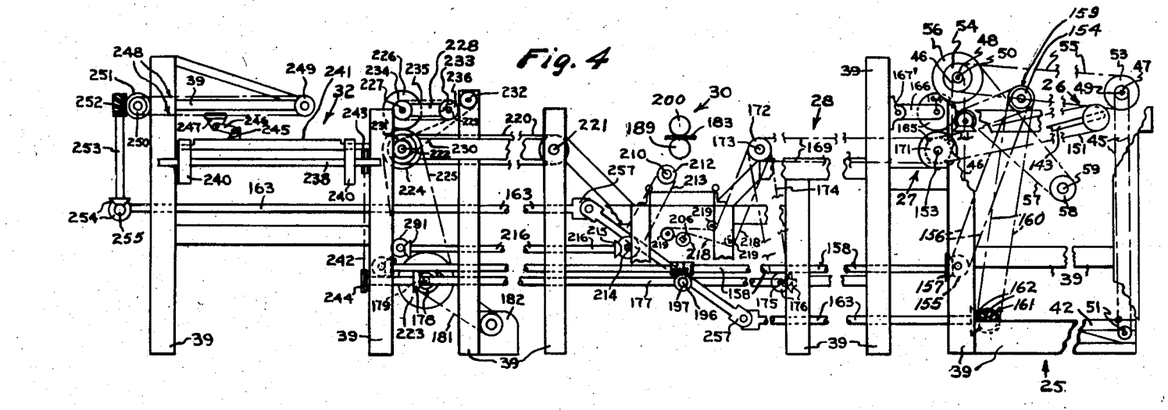
Fig. 4 is an elevational view taken substantially on broken line 4—4 of Fig. 2, with parts broken away, with parts removed, and with parts diagrammatically shown.

Parts comprising the elevator 25 are shown in part in perspective in Fig. 1, in part in plan in Fig. 2, in part in elevation to the right of Fig. 4 and in much greater detail in Figs. 6 to 12 inclusive.

In the interest of clarity, the main frame 39, for the most part, has been broken away and fragments thereof are shown and numbered. As obviously it is within the knowledge of those skilled in this art to provide suitable frame means, it is believed that the invention is better illustrated by removing most of the frame means rather than to complicate the drawings by showing the same.

An incoming stack of panels 40 is delivered by suitable means to the elevator 25 as by rotatably mounted infeed rolls 41. These infeed rolls 41 are suitably mounted for rotary movement and are of a type commonly employed around plywood mills as a conveyor means. The elevator platform 42 is provided with a plurality of openings 43 which are of a size to permit the platform 42 to pass downwardly through rolls 41 and not limit rotary movement of the infeed rolls 41. Thus, a stack of incoming panels 40 can be rolled into place above the elevator platform 42 and as the elevator platform 42 rises, it will elevate the stack of panels, as the partial stack 44 shown on the elevator platform 42. The stacks of panels 40 will include individual panels of the same dimension, as 4′ x 8′ panels. However, they may be of various other sizes as 5′ x 12′. Also, the individual panels of a stack 40 may have different thicknesses, such as $\frac{3}{16}''$ or $\frac{3}{4}''$. In order to get a common location from which adjustment may be made for panels of different lengths and widths, I have selected one corner, as the left forward corner, of the elevator 25, as viewed in Fig. 1, and a stack of panels will be initially located, as partial stack 44, so that the left and advancing edges will abut suitable vertical guides 39′ (see Figs. 6, 7, 8 and 12) which may be channel irons and a part of the frame structure 39. The remaining two edge portions of the stack of plywood will locate themselves in accordance with the width and length of the stack.

A means for raising the elevator platform 42 comprises endless chains 45 and 46 shown schematically by dot and dash lines in Figs. 1 and 4. At the upper ends the chains 45 and 46 are mounted on driven sprockets 47 and 48. The sprockets 47 and 48 are respectively mounted on transverse shafts 49 and 50, which extend transversely and across the construction but are broken away in Fig. 1 in the interest of clarity and they are shown in end elevation in Fig. 4. At the bottom, the chains 45 and 46 are mounted on idler sprockets 51 and 52 which are carried by frame structure 39. The shafts 49 and 50 carry sprockets 53 and 54 which mount drive chains 55 and thus shafts 49 and 50 are interconnected. Shaft 50 also carries a sprocket 56 which mounts chain 57 which is connected with a sprocket 58, see Figs. 4 and 9, and in turn with driven shaft 59.

Figures 6, 7, 8, 9, 10:
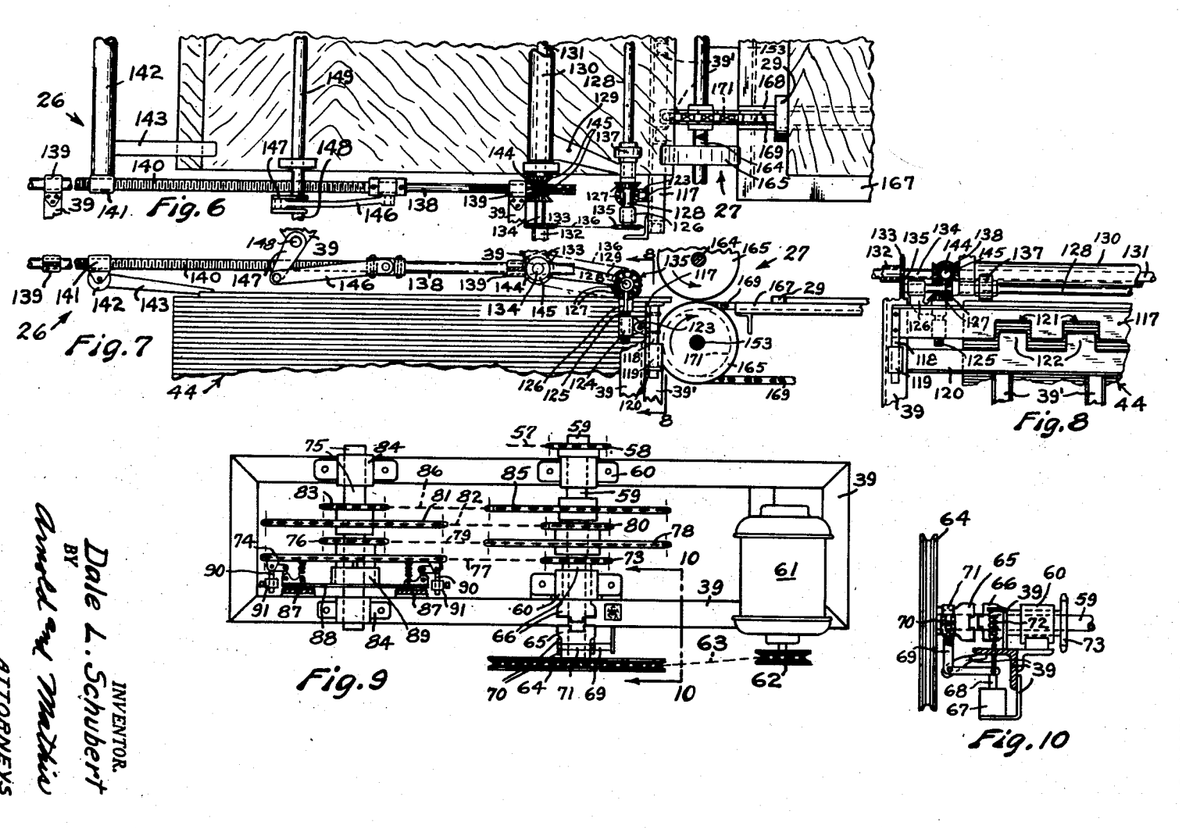
Fig. 6 is a fragmentary plan view, on a larger scale than Fig. 2, showing particularly a fragment of the kicker 26 and that portion thereof as appears in the lower right hand corner of Fig. 2.
Fig. 7 is a fragmentary side elevational view of parts shown in Fig. 6.
Fig. 8 is a fragmentary end elevational view taken substantially on broken line 8—8 of Fig. 7.
Fig. 9 is a detached plan view, with parts diagrammatically shown, of driving means for the elevator 25 which is shown to the right of Fig. 4 and to the left of Fig. 1.
Fig. 10 is a fragmentary elevational view taken substantially on broken line 10—10 of Fig. 9, parts being shown in section.

Preferably the means to drive shaft 59 comprises an electric motor which drives the elevator on its upward travel and which may be released or disengaged from the elevator to permit a rapid descent of an unloaded elevator. Means to accomplish this purpose is indicated in Fig. 9 of the drawings, where the shaft 59 is journaled in bearings 60 carried by a part of the main frame structure 39. The prime mover is indicated as electric motor 61 connected to any suitable source of electricity. The motor 61 has a drive sheave 62 and sheave 62 is connected by a V belt 63 with sheave 64. Sheave 64 is floatingly mounted on shaft 59 and is rigidly connected with one part 65 of an electrically controlled jaw clutch comprising jaw clutch part 65 and a mating jaw clutch part 66.

Referring more particularly to Fig. 10, the solenoid 67 is energized upon energizing of motor 61, as illustrated in the diagrammatic showing of Fig. 11 (hereinafter described). The armature 68 is pivotally connected with one end portion of a bell crank 69, which is pivotally supported by the main frame structure 39. The other end portion of the bell crank 69 terminates in a yoke 70, which is pivotally connected with a collar means 71, which floats in a groove in jaw clutch part 65. The parts 70 and 71 are common clutch throw out means and thus are somewhat diagrammatically illustrated in Fig. 10. Upon energizing of solenoid 67, the jaw clutch parts 65 and 66 are operatively engaged and upon de-energizing of solenoid 67, the tension spring 72 causes the jaw parts 65 and 66 to move out of engagement and thus the jaw part 66 is free to move independent of the motor 61.

When the jaw parts 65 and 66 are in engagement, rotary motion will be provided from motor 61 to sprocket 73 (Fig. 9). The sprocket 73 is connected with the jaw part 66 and turns therewith. Sprocket 74 is floatingly mounted on shaft 75 and is rigid with another sprocket 76. Sprockets 73 and 74 are interconnected by chain 77. Sprocket 76 connects with sprocket 78 through chain 79. Sprocket 78 is rigid with sprocket 80 and both float on shaft 59. Sprocket 80 connects with sprocket 81 by way of chain 82. Sprocket 81 and sprocket 83 are connected together and may be rigid with shaft 75 so that journals 84, connected with frame 39, function as bearings. Sprocket 83 connects with sprocket 85 by way of chain 86. Sprocket 85 is fixed on shaft 59. The various sprockets 73, 74, 76, 78, 80, 81, 83, 85 and chains 77, 79, 82 and 86 are illustrative of a gear reduction means between jaw clutch parts 65—66 and shaft 59. The exact speed reduction desired of course will depend upon the motor employed and the desired rate of travel of the elevator.

When motor 61 and solenoid 67 are de-energized, the clutch parts 65 and 66 will be in the disengaged position, shown in Figs. 9 and 10. At the same time, as the elevator platform 42 is descending, motion will be imparted to the sprocket 74 as the sprocket 58 (Fig. 9) is connected with sprocket 74 and the sprocket 58 (Fig. 4) is connected with the endless chains 45 and 46 carrying the elevator platform 42. The sprocket 74 carries a governor controlled brake so that the elevator platform 42 may descend at a controlled speed. As illustrative of a governor controlled brake, I have shown a fixed brake shoe 87 connected with the frame structure 39. A braking disc 88 is operatively disposed as respects said fixed brake shoe 87 and is floatingly mounted with the sprocket 74 on shaft 75. Preferably a hub 89 is connected with the braking disc 88. The hub 89 and the sprocket 74 are splined together to permit movement of said parts toward and away from each other and to relatively fix said parts so far as rotation is concerned. The movable braking disc 88 is movable toward and away from the sprocket 74, and in turn away from and toward fixed brake shoe 87, by means of a centrifugal governor which is illustrated by bell cranks 90 and weights 91. The speed of rotation of the sprocket 74, and in turn the rate of descent of the elevator platform 42 will be determined by adjustment of the weights 91. Thus, as long as the circuit of the motor 61, as will be hereinafter described, is energized, the solenoid 67 will be energized and jaw parts 65 and 66 will be in engagement.

Figure 11:
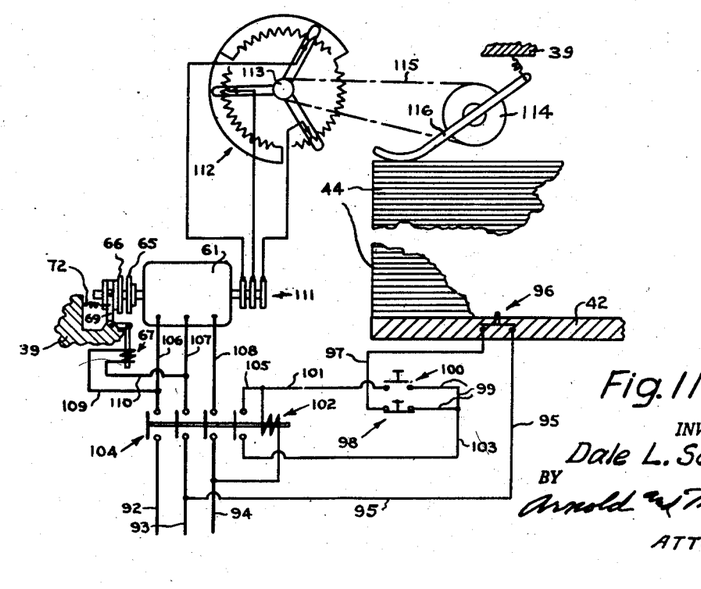
Fig. 11 is a fragmentary and somewhat diagrammatic view illustrating an electric circuit which may be employed in controlling the electric motor 61 of Fig. 9 for driving elevator 25.
Figure 12:
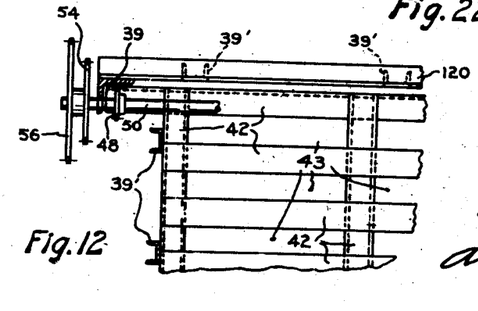
Fig. 12 is a fragmentary plan view, with parts in section, illustrating particularly the deck of the elevator 25 and some of the associated parts.

A circuit which may be employed to energize motor 61 is illustrated in Fig. 11 of the drawings. In such figure, the motor 61 is illustrated as a polyphase motor having a wound stator and a wound rotor. The two clutch parts 65 and 66 are diagrammatically illustrated as being respectively fixed to the shaft of motor 61 and a sheave floating thereon rather than showing all the parts as illustrated in connection with Fig. 9. Also, the solenoid 67, bell crank 69, and tension spring 72, are somewhat diagrammatically illustrated. Next, a fragment of the platform 42 and fragments of a stack of panels 44 are shown. A source of electric energy is indicated by conductors 92, 93 and 94. Energy on conductor 93 passes along conductor 95 and to normally open switch 96. Normally open switch 96 is carried by the platform 42 and is closed by reason of panels resting thereon. Thus, at all times when there is a panel on the platform 42 of the elevator 25, the switch 96 will be electrically closed. Energy passing through switch 96 passes along conductor 97 to normally closed switch 98. Switch 98 is the usual stop button employed in industrial circuits. Energy passing through switch 98 is imposed on conductor 99. Switch 100 is the usual starting switch employed in industrial circuits.

In the event that the elevator is loaded so the switch 96 is thus closed, upon momentary closing of switch 100, energy passes from conductor 95 through switch 100, by way of the circuit previously described, and is imposed on conductor 101. Energy on conductor 101 passes through relay 102 and thence to conductor 94, energizing relay 102. Once relay 102 is energized, energy on conductor 99 will pass along conductor 103 through one of the blades of the multiple switch mechanism 104 to conductor 105, and through relay 102. Thus, upon momentary contact of switch 100, the multiple switch mechanism 104 will be closed by relay 102 and will remain closed so long as switches 98 and 96 remain in electrically closed position.

Upon closing the multiple switch mechanism 104, conductors 106, 107 and 108 will be energized and the circuit to motor 61 will be energized. Conductors 109 and 110 are connected to conductors 106 and 107, and energize solenoid 67 which causes jaw clutch parts 65 and 66 to be connected. Thus, the elevator platform 42 will be connected to a prime mover, as motor 61.

The motor 61 is a variable speed motor and has slip rings 111 which are connected with a controller 112. The controller 112 may be of the rotary type and, as indicated, slows down and eventually stops motor 61 upon clockwise movement. Upon counterclockwise movement, the controller 112 causes motor 61 first to start and then to travel at a gradually increasing speed. The means to control rotary motion of the armature of the controller 112 includes linkage, as sprockets 113 and 114 interconnected by chain 115. Sprocket 114 is rotatably mounted on the main frame structure 39 and rigidly supports arm 116 for rotation with the sprocket 114. Thus, as arm 116 moves in a clockwise direction, the motor 61 decreases its speed and may be eventually stopped and upon counterclockwise movement of the arm 116 the motor 61 gradually increases its speed to its maximum speed. The arm 116 is operatively positioned above a stack of panels on the elevator platform 42, as indicated by 44, and thus maintains the level of the top of a stack of panels on the platform 42 of the elevator 25, in accordance with predetermined standards. In this connection, it is to be remembered that the kicker 26 operates periodically and it is thus a function of the control mechanism for the elevator 25 to maintain the top piece of a stack of panels 44, always present for the kicker 26 to eject horizontally from the stack each time the kicker operates, and this regardless of the thickness of the panel which is being ejected.

While each panel in a particular stack will have the same thickness, within commercially established standards, yet the construction of my invention is designed to operate upon consecutive stacks of panels wherein the panels of a particular stack have a different thickness than those of another stack.

When the last panel of a particular stack is removed from the elevator platform 42, then switch 96 opens, which de-energizes relay 102 and thus the motor 61 and solenoid 67 are de-energized. Upon de-energizing of solenoid 67, as hereinbefore explained, the jaw clutch parts 65 and 66 become disengaged and the elevator platform 42 of elevator 25 descends under control of the governor controlled brake comprising fixed brake shoe 87 and braking disc 88.

After the elevator platform 42 has fully descended, then a stack of panels 40 may be moved in place which will close switch 96 and the elevator may be started through another complete cycle by momentarily closing the switch 100.

In the foregoing description, I have indicated one means responsive to the elevation of the top surface of a stack of material on the elevator platform 42 to control the elevation of the top of the stack. As it is only necessary to keep the upper surface of the stack at a substantially constant elevation, obviously, dampening means can be employed so that the motor 61 is not constantly changing speed, but is operating at an average speed to maintain the desired results.

Kicker 26

Parts comprising the kicker 26 are shown in part in perspective in Fig. 1, in part in plan in Fig. 6, in part in side elevation in Fig. 7, in part in end elevation in Fig. 8, and in part in plan in Fig. 2.

In this kicker mechanism, means are provided so that only the top panel of a stack of panels 44 is removed at one time and adjustable means are provided to restrain movement of all panels below the top panel. This adjustable means comprises (see Figs. 6, 7 and 8) an angle plate 117, which has rods 118 which are slidably mounted in sleeves 119 carried by the main frame structure 39. The main frame structure 39 includes a cross frame or plate 120. Preferably the angle plate 117 and the plate 120 have mating recesses and tongues 121 and 122 to provide for a continuous support vertically considered for the panels in the stack 44.

The means to provide vertical adjustment of the angle plate 117 relative to various parts of the main frame structure 39 comprises brackets 123 pivotally connected with threaded sleeves 124. Threaded sleeves 124 threadedly receive screws 125 which are supported by a bearing 126 and are in turn connected with one of two bevel gears 127. The other bevel gear 127 is fixedly mounted on cross shaft 128. Cross shaft 128 is journaled in a bearing provided in an end portion of a bracket 129. The other end portion of the bracket 129 is rigid with cross sleeve 130 which extends across the machine and the brackets 129 at either side of the machine are supported for pivotal movement by the sleeve 130 about the shaft 131 as an axis. The sleeve 130 floats on cross shaft 131.

Sleeve 132 (see also Fig. 2) is turned by means hereinafter described. Sleeve 132 is connected with sprocket 133 and both are floatingly mounted on shaft 134. Sprocket 133 is connected with sprocket 135 by means of chain 136. Sprocket 135 is rigidly mounted on shaft 128 and shaft 128 carries one of the two bevel gears 127 as previously mentioned.

Turning movement of sleeve 132 is imparted to sprocket 135 and thence through bevel gears 127 to screws 125. Thus, threaded sleeves 124, and in turn brackets 123, and in turn plate 117, are adjusted vertically. The plate 117 is adjusted to retain panels below the top panel, so that only the top panel can be urged over the top of plate 117.

Rolls 137 are rotatively mounted on shaft 128 and ride on the top panel in the stack. Thus, a slot-like arrangement is provided where the top part of the slot is determined by the rolls 137 and the bottom portion of the slot is determined by the relative adjusted position of plate 117 relative to rolls 137. In order that all adjustments for thickness may be brought to a common adjusting screw, the structure just described is employed so that angular movement of sleeve 132 determines the relative spacing between rolls 137 and plate 117.

As previously explained, the stack of panels, regardless of the length and width of the stack, is always urged into a predetermined location, as the left forward corner portion of the elevation as viewed in Fig. 2. In such position, the vertical guides 39' will function as guide means for proper positioning of the stack (see Fig. 12). In order that the kicker mechanism may properly urge panels into the squeeze rolls 27 regardless of the width of the panels, an adjustment must be provided for the stroke of the reciprocating kicker members.

Referring more particularly to Figs. 6, 7, and 8, shafts 138 at each side of the device are each mounted in spaced bearings 139 carried by the main frame structure 39. Each of these shafts 138 is provided with a threaded portion 140 which threadedly connects with a threaded sleeve 141. Threaded sleeves 141 carry transverse bracket 142 and kicker arms 143 are rigidly connected to transverse bracket 142. Each shaft 138 is splined to and is longitudinally movable as respects a bevel gear 144. Thus, bevel gears 144 rotate with their respective shafts 138 but each shaft 138 is longitudinally reciprocable through its bevel gear 144. Each bevel gear 144 is held against movement longitudinally of its shaft 138 by bevel gears 145 and one of the sleeves 139. In order to impart reciprocating motion to the shaft 138, each arm 146 has one end portion pivotally connected with shaft 138 and the other end pivoted to crank 147. Each arm 146 is fixed against longitudinal movement relative to shaft 138 and is angularly movable thereon. Shaft 148 is a driven shaft and thus rotary motion of shaft 148 will impart longitudinal movement to the shaft 138. As there are paired arms 146 and cranks 147 at each side of the device, a cross shaft 149 interconnects the said cranks.

In order to adjust the stroke of the kicker arms 143 so that the forward edge of the panels will be projected the same distance, regardless of their width, the arms 143 are adjustable longitudinally of the threaded portions 140 of the shafts 138. The means to provide this adjustment comprises driven shaft 134 and bevel gears 145 and 44. The drive to the shaft 138 to the right of the device is through one of the bevel gears 145 and a bevel gear 144 which is splined to the shaft 138. The drive to the shaft 138 at the left side of the device is through bevel gears 145 and 144, through shaft 131, and through bevel gears carried by shafts 131 and 138 (at the left side of the device), one of which bevel gears is numbered 144 as it is carried by, and splined on said shaft 138.

Upon rotation of the shaft 131 in the desired direction, the shafts 138 will be rotated and the relative longitudinal positions of the sleeves 141 as respects the shafts 138 will be determined and thus the starting position of the throw of arms 143 will be adjusted.

The shaft 148 is described as a driven shaft. One means of driving shaft 148 (see Fig. 2) is to provide a sprocket 150 thereon. Sprocket 150 is connected by chain 151 to sprocket 152. Sprocket 152 is connected to driven shaft 153. Shaft 153 is driven by means hereinafter more particularly described.

As an adjustment for width, length or thickness at one part of the machine will require similar adjustments in other parts of the machine, I prefer to connect the various adjustable devices to a common adjusting means. As to the adjustment for thickness which has just been discussed in connection with the kicker mechanism, sleeve 132 rigidly carries a sprocket 154 (see Fig. 2). Sprocket 154 connects with sprocket 155 by means of chain 156. Sprocket 155 is connected with bevel gears 157 and thereby with control shaft 158. Control shaft 158 is disposed so that connections thereto can be made to structures needing adjustment where panels of different thicknesses are being run.

Shaft 134 rigidly carries sprocket 159 which is connected by chain 160 with sprocket 161. Sprocket 161 is connected by bevel gears 162 to control shaft 163. Control shaft 163 is suitably disposed so that various structures, needing adjustment when panels of different widths are run through the machine, can be connected to said shaft 163.

Squeeze rolls 27 and chain conveyor 28

As a panel has its advancing edge always projected the same distance because of the adjustable kicker mechanism 26, the advancing edge will always be engaged by the squeeze rolls 27.

The squeeze rolls 27 comprise cross shafts 153 and 164 (see Fig. 7). Cross shaft 153 is a driven shaft and is mounted in fixed bearings. Cross shaft 164 may be a driven shaft or an idler shaft and is illustrated as an idler shaft and it is floatingly mounted as by means of a bracket arm 166 (see Fig. 4) on each side of the device. The bracket arms 166 are each pivoted, as by pivot means 167', to the main frame structure 39. The panel engaging rolls 165 are carried by shafts 153 and 164. Shaft 164 is held down by springs or by sufficient weight so that the panel passing between top and bottom rolls 165 will be urged by driven lower rolls 165 onto the chain conveyor 28. While the top rolls 165 are not shown as being driven rolls, they can be driven in any suitable manner such as that explained in connection with the second squeeze rolls 31 which will be hereinafter described.

The chain conveyor 28 comprises a deck 167 having longitudinal slots 168 (see Figs. 6 and 7) in which slots are slidably mounted conveyor chains 169 having cleats 29 rigidly secured thereon. The cleats 29 are alined transversely of the machine to urge a panel to and past the first brander 30.

The conveyor chains 169 are carried by sprockets 171 and 172, carried by shafts 153 and 173 respectively (see Figs. 4, 6 and 7). The conveyor chains 169 are employed both as conveyor chains and as drive means so that driven shaft 173 drives shaft 153.

Driven shaft 173 (see Fig. 4) is connected by chain 174 with shaft 175. Shaft 175 is connected by bevel gears 176 with shaft 177. Shaft 177 is connected to bevel gears 178. Bevel gears 178 interconnects shafts 177 and 179 (see both Figs. 4 and 5). Shaft 179 (see Fig. 5) carries sprocket 180 which is connected by chain 181 to motor 182. Shafts 177 and 179 function to drive substantially all of the various parts of the mechanism and will hereafter be referred to as main driving shafts and their connection through sprocket 180 and chain 181 to motor 182 will not be repeated.

First brander 30

As the device may handle stacks of panels where each panel of the stack has common dimensions but different stacks do not have panels of the dimensions found in other stacks, adjustments must be made in the first brander to take care of branding panels of different lengths. Also, it is desirable that the panels be branded uniformly so far as their thickness is concerned and hence adjustments should be made to take care of panels of different thicknesses. Also, it is desirable that the brands bear a definite relation to the trailing edge of each panel.

As the drive for the kicker 26 is taken off of shaft 153 and as shaft 153 is driven by the conveyor chains 169, obviously the kicker arms 143 will travel synchronously with the cleats 29, and one panel will be presented for each set of cleats 29. Also, as the panels are being urged from their trailing edge portions by cleats 29, there will be a direct relation to the positions of the brands made by the first brander 30 and the trailing edges of each panel. For some widths of panels the first brand on the end edges may be a partial brand but each panel of a given width will have the same partial or complete brand on the leading edge. This permits the panels to be stacked and the brands on the end edges will be in vertical alinement. Such arrangement is preferable for optimum results so far as appearance is concerned.

The first brander 30 comprises two spaced apart brander heads. These are relatively adjustable toward and away from each other which may be accomplished by moving either or both. In the drawings, I have shown that the brander 30, to the right in Fig. 2, is adjustable toward and away from the brander 30 to the left. The two branders 30 for branding the end edges of a panel may be identical with the two spaced apart branders 35 for branding the side edges of a panel. Thus the branders 30 and 35 are only somewhat diagrammatically illustrated in Fig. 2 and the details of one of the branders are shown in Figs. 13 to 18 inclusive. The branders 35 are mounted for relative movement toward and away from each other similar to the branders 30. In view of the foregoing the description of the branders will be directed primarily to a movable brander.

Figure 13:
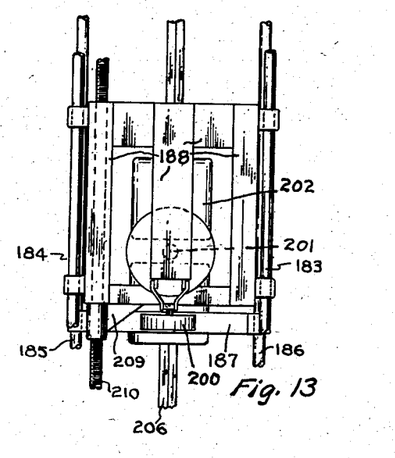
Fig. 13 is a fragmentary plan view illustrating particularly one of the branders such as one of the branders of the first brander 30.
Figures 14, 16:
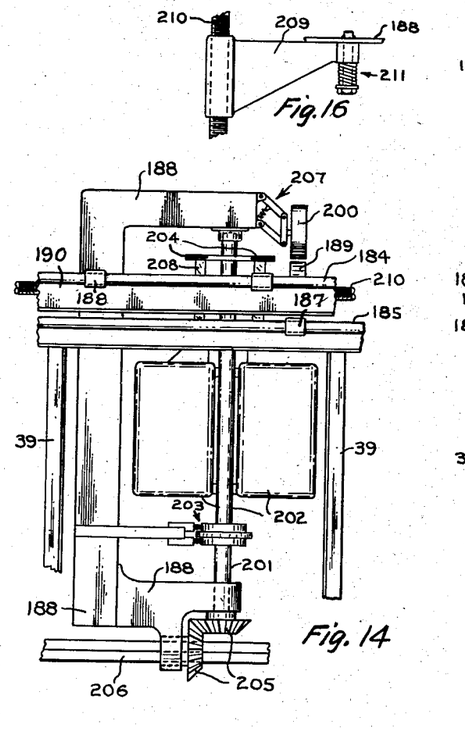
Fig. 14 is a fragmentary side elevational view of structure shown in Fig. 13.
Fig. 16 is a fragmentary plan view of parts shown in Fig. 13 and particularly the lower left hand corner of said Fig. 13.
Figure 15:
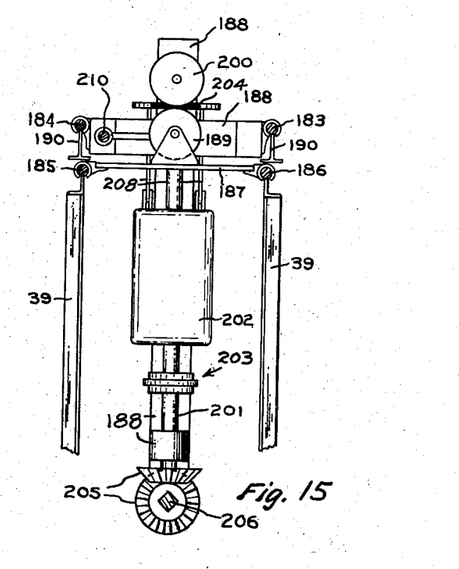
Fig. 15 is a fragmentary end elevational view, with parts in section, of parts shown in Fig. 14.
Figures 17, 18:
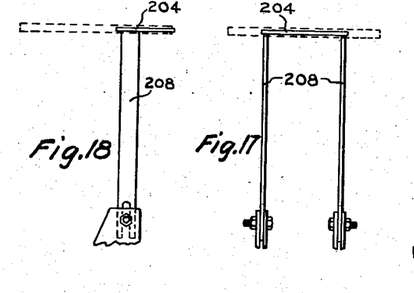
Fig. 17 is a detached fragmentary view of electrical bus members shown in Figs. 14 and 15.
Fig. 18 is a fragmentary side elevational view of the members shown in Fig. 17.

Referring to Fig. 3, and to Fig. 19 (which shows an enlarged fragment of parts of Fig. 3), and to Figs. 13 to 18 inclusive, cross shafts 183 to 186 inclusive mount both branders 30. Each brander comprises a cross frame 187 which is slidable on shafts 185 and 186. Shafts 185 and 186 are supported by the main structure 39 and thus are fixed. Thus cross frame 187 is fixed in elevation but is movable transversely with frame 188. The cross frame 188 is mounted for sliding movement transversely of the machine on cross shafts 183 and 184. Panel supporting roll 189 is carried by the frame 187 and thus supports all panels at a common level at the bottom. The frame 188 is relatively vertically movable toward and away from frame 187 by structure best shown in Figs. 3 and 19. Longitudinal frame means 190 on each side of the device (as shown in Figs 3 and 15) are carried by brackets 191 (see Fig. 3). Brackets 191 are pivotally supported by bell cranks 192 which bell cranks are pivoted to the main frame 39 by pivots 193. The other ends of bell cranks 192 are interconnected by link 194. Thus we have a pantograph construction and upon longitudinal movement of link 194 in one direction, the frame 188 is lowered and upon movement of said link 194 in the opposite direction, frame 188 is raised. An adjusting means for longitudinally moving link 194 is indicated generally by 195 in Fig. 3 and the details thereof are shown in Fig. 19. The link 194 is rigidly connected with a screw 196 and screw 196 threadedly carries worm wheel 197. Worm wheel 197 is mounted for rotation and side thrust is prevented by thrust means 198 connected with the main frome of the machine. Worm wheel 197 threadedly engages worm 199 rigid on shaft 158. Shaft 158 was described in connection with the elevator 25 and provides a common means to adjust various parts of the device where an adjustment for thickness of stock is required. As both brander heads 30 have their vertically movable portions supported on cross shafts 183 and 184 and as cross shafts 183 and 184 move vertically with frame means 190 and brackets 191, both branders are vertically movable from a common source.

Referring again to Figs. 13 to 18 inclusive, the frames 188 of each brander rotatably mount panel hold-down feed rolls 200. Also the frames 188 of each brander rotatably support shafts 201. Shafts 201 carry heater means for the branders which are preferably in the nature of transformers 202. The primary of these transformers is fed from any suitable source of electricity via slip ring and brush means 203. The secondary of the transformers 202 is closed through arcuate shaped brander elements 204. By the use of transformers 202 high voltage and low amperage energy can be fed via brush and slip ring means 203 and high amperage low voltage energy will be available from the secondary to heat brander elements 204. The shaft 201 of each brander is mounted for rotary movement so that the brander elements 204 are in synchronism with the cleats 29. This may be accomplished by bevel gears 205 interconnecting shafts 201 and 206. As one of the branders 30 is movable, the shaft 206 may be in the nature of a square shaft so that the bevel gear 205 which is powered from shaft 206 can move longitudinally of the shaft 206 and still be driven by said shaft 206. The frame 188 floatingly supports panel hold-down feed roll 200 by spring pressed parallel link means 207. While there may be any number of brander elements 204, I have shown two brander elements and a transformer for each brander element. The brander elements 204 are connected by bus bars 208 with a transformer 202. The brander elements 204 are preferably interconnected by insulation material to form a common unit as shown.

The brander which is movable has its frame 188 resiliently connected to a bracket 209 which threadedly engages adjusting screw 210 (see Figs. 13 and 16). The resilient means 211 between the frame 188 and the bracket 209 permits some movement of the frame 188 as panels are passing the branders without this movement being reflected to the adjusting screw 210. The adjusting screw 210 preferably engages with only one of the branders 30 and the frame 188 of the other brander is fixed against crosswise movement.

Referring to Figs. 2, 4 and 13, screw 210 is journaled in the main frame and is provided with suitable thrust bearings to prevent longitudinal movement thereof. The screw 210 mounts sprockets 212 (Figs. 2, 3 and 4) and sprocket 212 mounts chain 213 (Figs. 2 and 4). Chain 213 is driven by shaft 214. Shaft 214 is connected by bevel gears 215 to shaft 216. Shaft 216 is connected with the various structures of the machine to provide for an adjustment for length of panel. The means to rotate shaft 216 in either direction which adjusts various parts for length, the means to rotate shaft 158 in either direction which adjusts various parts for thickness, and the means to rotate shaft 163 in either direction which adjusts various parts for width, are disposed in housing 217 shown in Fig. 2 and shown in detail in Figs. 20, 21 and 22. The structure involved in Figs. 20, 21 and 22 will be hereinafter described.

Shaft 173 is driven as previously described and shaft 173 drives shaft 206 by means of sprocket and chain means 218, appearing to the left of Figs. 2 and 3 and toward the mid portion of Fig. 4. Also, as indicated toward the mid portion of Fig. 4, idler sprockets 219 may be employed.

Squeeze rolls 31 and conveyor thereto

As panels are delivered from the first brander 30 they are delivered to a conveyor comprising belts 220. The belts 220 to the right, as shown in plan in Fig. 2 are shorter than those to the left to permit the adjustable brander 30 to move between the belts 220 and conveyor chains 169. The shaft 173 thus supports pulleys on which some of the belts 220 have one lap mounted and the shaft 221 mounts pulleys on which other of said belts 220 have one lap mounted. The shaft 222 supports pulleys on which laps of all belts 220 are mounted. While some drive will be provided by the longer belts 220 between shafts 173 and 222, preferably the shaft 222 is positively driven by link belt means. Referring to Fig. 4, the shaft 179 (one of the main power shafts) functions as a source of power and drives sprocket 223. Sprocket 223 drives sprocket 224 by way of chain 225. Sprocket 224 drives shaft 222 and in turn belts 220. The upper squeeze rolls (i. e., the upper rolls of those referred to as squeeze rolls 31 in Fig. 1) and numbered 226 in Fig. 4, are mounted on a cross shaft 227. Cross shaft 227 is floatingly mounted by spaced links 228 pivoted to the main frame by a cross shaft 229. Sufficient weight may be provided in links 228 or resilient hold-down means provided in connection therewith so that the upper squeeze rolls 226 will provide the desired frictional engagement with panels. Chain 230 is mounted on sprocket 231 and on sprocket 232 which is supported from the main frame structure 39. Sprocket 233 on shaft 229 is connected to sprocket 234 carried by shaft 227 by means of chain 235. Sprocket 233 carries a sprocket 236 and sprocket 236 engages one lap of chain 230. Thus the upper squeeze rolls 226 and belts 220 are driven. This same construction may be employed in connection with the squeeze rolls 27 (so marked in Fig. 1) which are mounted on shafts 153 and 164 to drive both of said shafts.

Referring now to Fig. 1, branded stock leaving the first brander 30 is transferred by belts 220 to squeeze rolls 31 and by reason of driven squeeze rolls 31 the stock, having its end edges branded, is delivered to the direction changer 32.

Direction changer 32

This direction changer 32 is shown in plan in the upper left hand corner of Fig. 2, in end elevation toward the left of Fig. 4, and in the upper portion of Fig. 1. This direction changer 32 comprises spaced shafts 237 and 238 mounting sprockets 239 and 240. The shafts 237 and 238 are journaled in the main frame means 39. Chains 33 are mounted on sprockets 239 and 240. A deck 241 is provided on which panels may slide. Slats or cleats 34 are carried by chains 33 and slide on the deck 241. Shaft 237 and in turn the chains 33 and the slat or cleat 34 are driven by a chain 242 mounted on sprockets 243 and 244 mounted respectively on shafts 237 and 177. Shaft 177 is a main drive shaft as previously explained.

As it is desired to pass panels out of the direction changer, lengthwise of the panels, and against one edge of the direction changer, regardless of the width of a panel, an adjustable stop 245 is provided. This adjustable stop has each end portion pivoted to a link 246 and the links in turn are pivotally connected with slides 247 mounted for sliding adjustable movement in the main frame 39. Each slide 247 (see Fig. 4) is connected with a chain 248. The chains are mounted on sprockets 249 and 250. The shaft which carries sprockets 250 is connected with a worm wheel 251. The worm wheel 251 engages worm 252 on shaft 253. Shaft 253 is connected by bevel gears 254 to shaft 255 (shown in plan in Fig. 2). Shaft 255 is connected by bevel gears 256 to shaft 163 (see Fig. 2). The shaft 163 is provided with universal joints 257 (see elevation, Fig. 4) to provide the shaft 163 at the appropriate levels. However, for functional purposes the shaft 163 is a continuous shaft. Upon rotation of the shaft 163 in the proper direction the chain 248 will be moved so that the stop 245 will be moved toward the left or the right as viewed in Fig. 4 to accommodate panels of a predetermined width. The end portion of the stop 245 under which the slat 34 first travels overhangs the shaft 238 so that the slat 34 will always travel under stop 245 as the slat travels upwardly and around sprockets 240 and then toward the right as viewed in Fig. 1. As appears in Fig. 2 in conjunction with Fig. 4, the stop 245 is mounted at its end portions and floats on the deck 241. Thus slat 34 first lifts one end portion of the stop 245 and as it slides thereunder it finally drops the leading portion of the stop 245 and then lifts the trailing portion of the stop 245. Thus the stop 245 will function to stop panels in accordance with its adjusted position and at the same time the slat 34 moves panels along the deck 241.

Second brander 35

Figure 5:
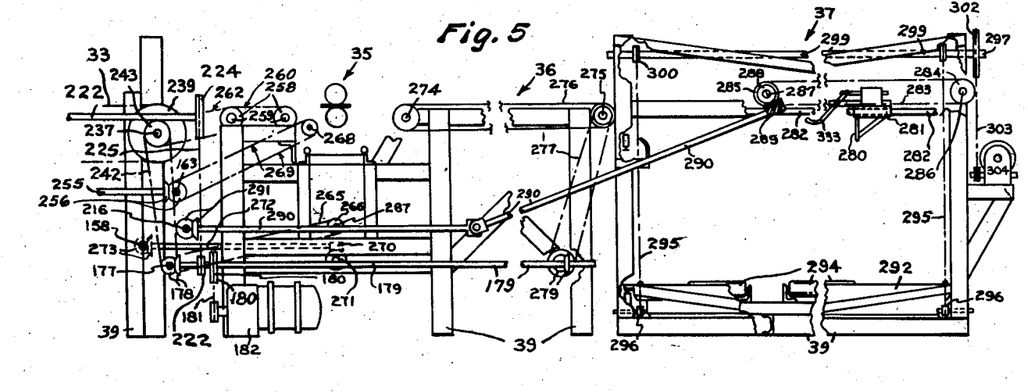
Fig. 5 is an elevational view taken substantially on broken line 5—5 of Fig. 2, with parts broken away, with parts removed, and with parts diagrammatically shown.

Panels leaving the direction changer 32 and which are being urged by a slat 34 are delivered onto driven conveyor rolls 258 (see Figs. 2 and 5). These rolls are mounted on shafts 259 and shafts 259 are interconnected by a chain 260. One of the shafts 259 carries a sprocket 261 which is connected by a chain 262 to a sprocket 263 mounted on shaft 237. Shaft 237, as previously explained, was a driven shaft for conveyor chains 33.

Main drive shaft 177 carries sprocket 264 shown in Fig. 2. Sprocket 264 drives chain 265 (see also Fig. 5) which drives a sprocket 266 mounted on shaft 267. Shaft 267 is the counterpart of shaft 206. As described in connection with shaft 206 and particularly in connection with Figs. 3, and 13 to 18 inclusive, shaft 206 was the driving shaft for driving the brander heads and permitting relative lateral adjustment between the brander heads. Thus it is believed that no further detailed description need be given of the means to drive the brander heads 35 as the parts described in connection with the branders 30 on shaft 206 can be duplicated and driven by the square shaft 267 and the driving means therefor just described.

Also, the brander heads 35 are relatively movable toward and away from each other and are adjustable for thickness. As to the means for adjusting one of the brander heads 35 toward and away from the other, it is to be remembered that upon rotation of screw 210 (see particularly Figs. 13 to 15 inclusive) the brander heads were relatively movable toward and away from each other so far as length is concerned in connection with the first brander 30. Similar construction obtains in connection with the second brander heads 35 and they are movable toward and away from each other by rotation of adjusting screw 268. Screw 268 functions similarly to screw 210 of the first brander 30 to move the brander heads relative to each other. However, as we have the width rather than the length of the panels involved in branders 35, the screw 268 is driven by different means than was screw 210. Screw 268 is connected by a chain 269 with the shaft 163. The shaft 163 adjusts the various parts of the mechanism for width. Thus by connecting the screw 268 which is connected with one of the two branders 35, these second branders 35 will be movable relatively toward and away from each other to accommodate panels of a predetermined width. The second branders 35 are mounted on mechanism which is a duplicate of that shown in Fig. 3. In view of this, the details as to the mounting of the second brander are only in part shown. Referring to Fig. 5 the worm 270 has the same function as worm 199 of Fig. 19. The worm wheel 271 has the same function as worm wheel 197. Worm 270 is mounted on shaft 272 which is connected by bevel gears 273 with shaft 158. Shaft 158 is the shaft which adjusts the various parts of the mechanism for thickness. Thus upon rotation of shaft 158 the secondary branders 35 also will be adjusted for thickness.

Belt conveyor 36

Material leaving the second branders 35 is conveyed by off-bearing conveyor belts 36 to any suitable means such as a stacker 37. The belt conveyor 36 comprises shafts 274 and 275 (see particularly Fig. 5) journaled in the main frame and belt members 276 carried by pulleys on said shafts 274 and 275. The shafts 274 and 275 are driven by sprocket and chain means 277 connected with one of said shafts as 275. Sprocket and chain means 277 are connected with a shaft 278 (see Fig. 2). Shaft 278 is connected by bevel gears 279 (see Fig. 5) with main power shaft 179. Thus material discharged from second brander 35 is removed by off-bearing conveyor belt 36 to any suitable location as to stacker 37.

Stacker 37

As the panels are guided by the stop 245 they will always be toward the side of the machine nearest to the viewer in Fig. 1. Hence there need be no adjustment for the width of the panels in the stacker 37. However, the panels of a given stack may be of different lengths and hence stop means adjustable for the length of the panels is preferably provided so that the panels are stacked in a uniform stack in the stacker 37. This stop means comprises a transverse stop frame 280 (see Figs. 1, 2 and 5) provided with spaced apart sleeves 281 slidable on spaced apart shafts 282. The transverse stop frame 280 has its end portions connected with endless chains 283. Endless chains 283 are mounted on sprockets 284 and 285 (see particularly Fig. 2). Sprockets 284 are mounted on cross shaft 286 and sprockets 285 are mounted on cross shaft 287. Cross shaft 287 carries a worm wheel 288 (see particularly Fig. 5) which meshes with worm 289. Worm 289 is mounted on shaft 290 and shaft 290 is connected by bevel gears 291 (see particularly Figs. 4 and 5) with the shaft 216 which controls the adjustment of the various parts of the apparatus for a length dimension.

The stacker 37 comprises an elevator stacker platform 292 (see Fig. 1) which has a plurality of openings 293 which may pass downwardly past rolls 294 so that when the elevator stacker platform 292 is in its lowest position a stack of panels can be delivered from the stacker 37 and the stack will be supported by the rolls 294 so that the stack can be rolled out of the stacker.

The elevator stacker platform 292 is supported by four chains 295 preferably at the corners of the platform. These chains 295 have their lower ends mounted on idle sprockets 296. Longitudinally extending shaft 297 supports sprockets 298 on which are mounted two of the chains 295. Another longitudinally extending shaft 299 carries sprockets 300 and said sprockets 300 mount the other two chains 295. The shafts 297 and 299 are interconnected as by chain 301 and sprockets 302. One of the sprockets 302 is connected by a chain 303 with a motor 304. As the motor 304 is driven in one direction the stacker platform 292 raises and as the motor 304 is driven in the opposite direction the stacker platform 292 is lowered.

Figure 23:
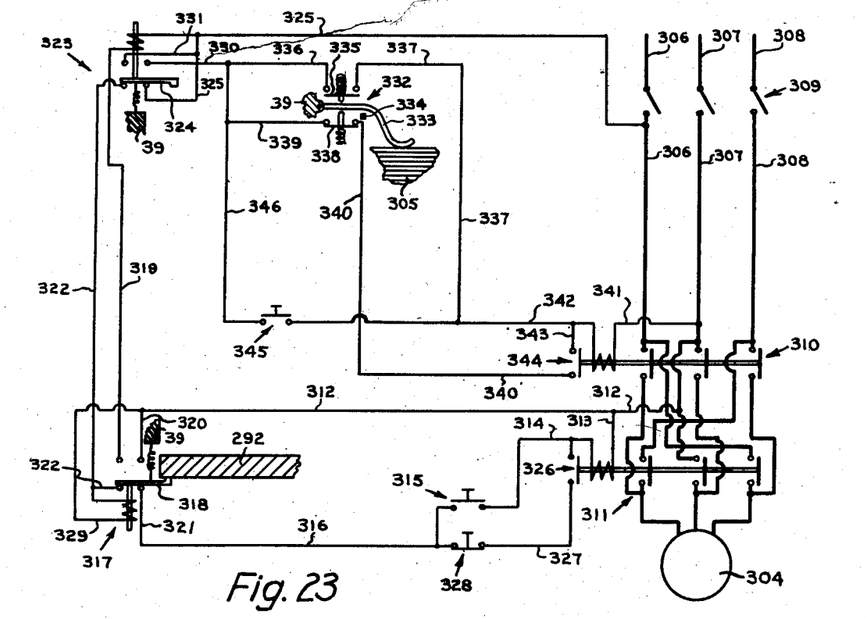
Fig. 23 is a diagrammatic view illustrating an electric circuit which may be employed in connection with the stacker 37.

The means for controlling motor 304 are best illustrated in the wiring diagram, Fig. 23. In said figure the source of energy is indicated as polyphase, such as three phase. Obviously, the wiring diagram can be changed to permit the use of other types of electrical energy. Also, in said figure a fragment of the top of a stack of panels in the stacker 37 is indicated by 305. A fragment of the elevator stacker platform 292 is also diagrammatically illustrated in Fig. 23. Generally considered it is desired that the elevator stacker platform 292 will come to rest at the bottom so that a stack of panels can be removed as they are supported on rolls 294 and then by manual manipulation the elevator stacker platform 292 will go through a complete cycle and come to rest again at the bottom when a complete stack of panels is disposed thereon. Thus, generally speaking, the elevator will rise until it reaches its topmost position. Then as panels are delivered onto the stacker the elevator will progressively descend without further manual manipulation until it is completely loaded with a stack of panels and then we will have reached the end of a cycle.

Referring now more specifically to the wiring diagram, a source of electrical energy is indicated by conductors 306, 307, and 308. A main switch 309 is preferably provided. The conductors before and after the main switch 309 are given similar numbers. A relay controlled switch 310 controls energy to motor 304 during the down movement of elevator stacker platform 292 and relay control switch 311 controls upward movement of the elevator stacker platform 292.

Assuming that the platform is down and the stack of panels loaded thereon during the previous cycle have been removed, motor 304 may be caused to rotate in the proper direction upon closing of switch 311 which is controlled by the following control circuit. Commencing with energy on conductor 307, the same is connected with conductor 312. Conductor 313 connects with conductor 312 and with the relay of switch 311. The relay of switch 311 is connected with conductor 314. Conductor 314 is connected with momentary contact switch 315. Switch 315 is of the usual industrial start type so that it is normally open and may be depressed to provide a momentary contact. When switch 315 is momentarily depressed energy will pass from conductor 314 through switch 315 to conductor 316. Relay switch 317 is spring loaded and when not under the influence of external forces is of a type so that blade 318 thereof normally provides a contact between conductors 319 and 320. As the elevator stacker platform 292 moves to its lowermost position it moves the blade 318 to provide an electrical connection between conductors 321 and 322. Conductor 322 connects with relay switch 323. Switch 323 is spring loaded and when not subject to other forces its blade 324 normally provides a connection between conductors 322 and 325. Conductor 325 is connected to conductor 306 and hence upon closing of momentary contact switch 315, I provide a circuit between conductors 307 and 306, thus energizing the relay of switch 311 and closing the circuit between conductors 306, 307, and 308 to motor 304. Once the circuit is thus closed the relay of switch 311 will close a circuit from conductor 314 through switch 326 to conductor 327 and through stop switch 328 to conductor 316. Stop switch 328 is the usual industrial "stop" type of switch and normally closes a circuit between conductors 316 and 327 and may be momentarily depressed to interrupt a circuit between such conductors. Thus the relay or holding coil of switch 311 will maintain switch 311 closed once the circuit has been closed by depressing of switch 315 under the conditions mentioned. Also, the circuit through the holding coil of switch 311 passes through switches 317 and 323 and the circuit can be interrupted by a change in the position of either switches 317 or 323.

The switch 317 has a relay or holding coil therein and the switch 317 will maintain its blade 318 interconnecting conductors 321 and 322 as long as the following circuit is maintained. This circuit commences with conductor 312 and thence to conductor 329 as previously explained. Energy on conductor 329 passes through the holding coil or relay of switch 317 and thence to conductor 322. As the blade 324 of switches 323 interconnects conductors 322 and 325 (when not subjected to other forces), the holding coil of the switch 317 will be energized even though the elevator stacker platform 292 moves upwardly and does not urge the blade 318 of the switch 317 to connect conductors 321 and 322. Thus once the elevator starts to rise it will continue to rise until the blade 324 of switch 323 interrupts connection between conductors 322 and 325.

Once the elevator platform 292 has reached the top of its travel it will move switch blade 324 into connection between conductors 330 and 331 and interrupt connection between conductors 322 and 325. Upon interruption of connection between conductors 322 and 325 the relay of switch 311 will be de-energized and switch 311 will open. Also, the holding coil of switch 317 will be de-energized and blade 318 will provide connection between conductors 319 and 320.

Switch 332 has an arm 333 in a position to ride on the top of a stack of panels 305 carried by the elevator stacker platform 292. A stop 334 limits the ultimate downward movement of the arm 333. The switch 332 is provided with a blade 335 which is spring loaded so it normally interrupts connection between conductors 336 and 337. The switch 332 has another blade 338 which is spring loaded urging blade 338 into electrical connection between conductors 339 and 340. The arm 333 is spring loaded or of sufficient weight and when panels are not present to a sufficient height on the platform 292 the arm 333 moves the blade 338 out of contact between conductors 339 and 340. As the panels are delivered onto the platform 292 the level thereof commences to rise causing the arm 333 to rise and permitting blade 338 to interconnect conductors 339 and 340. As the stack of panels rises further then arm 333 moves blade 335 into connection between conductor 336 and 337.

In such last mentioned position of the arm 333, energy from conductor 307 passes along conductor 341 through the relay or holding coil of switch 310 and thence to conductor 342. Conductor 342 is connected with conductor 337. As blade 335 interconnects conductors 337 and 336, energy on conductor 337 is connected with conductor 336 and thence to conductor 330. As the platform 292 in moving to its upper position moved blade 324 to interconnect conductors 330 and 331, energy on conductor 330 passes to conductor 331, thence to conductor 325, and thence to conductor 336. Thus as the panels delivered to the stacker raise the height of the stack to a level to move arm 333 upwardly and to interconnect conductors 336 and 337 by way of blade 335, a circuit was energized which included the relay of switch 310 and the motor 304 is driven in a direction to move the platform 292 downwardly.

In order that the motor 304 can travel a suitable distance each time it is energized rather than being continuously intermittently operated, a circuit is provided through blade 338 to maintain the circuit for a predetermined period of travel, such as 4", once the circuit has been closed through blade 335.

The last mentioned circuit commences with conductor 342 which is connected with conductor 343. As previously stated the relay or holding coil of switch 310 is energized and hence switch 344 interconnects conductors 343 and 340. Conductor 340 is connected to conductor 339 because of the position of blade 338. Thus once the platform 292 starts downwardly because of the position of blade 335, it will continue to move downwardly until arm 333 moves blade 338 out of connection between conductors 340 and 339. Thus by the use of blades 335 and 338 the elevator can be moved downwardly and it will continue to move downwardly a predetermined distance such as 4" or any other desired amount.

After each amount of predetermined travel downwardly of the paltform 292, the motor 304 will be at rest until enough further panels are delivered to the stacker to move the blade 335 into contact between conductors 336 and 337. This cycle of operation will continue until the platform 292 reaches the extreme bottom of its travel.

Upon the platform 292 reaching the extreme bottom of its travel, it will move the blade 318 out of connection between conductors 319 and 320 which will interrupt the circuit to the holding coil or relay of switch 323 and blade 324 will interrupt connection between conductors 330 and 331 and establish connection between conductors 322 and 325. Once connection is broken between conductors 330 and 331, the relay of switch 310 will be deenergized and switch 310 will open. In this position we have completed a cycle and a new cycle can be started in the manner previously described by momentary contact of switch 315.

From the prevous description it will now readily appear that by momentary contact, the elevator platform 292 is raised to its uppermost level and is perodically driven downwardly by motor 304 in response to the upper level of panels resting on the platform 292. At times it may be desired to unload the platform 292 manually and when a full load is not present thereon.

The circuit to manually energize motor 304 to lower the platform 292 after the same has moved upwardly, comprises a normally open switch 345 disposed between conductors 342 and 346. This circuit by-passes switch 332 and as long as manual switch 345 is closed the platform 292 may be caused to continue its descent or to move downwardly after it has been caused to move for its full travel upwardly.

In the various circuits just described electrical interconnections were provided between the blade 324 of switch 323 and the blade 318 of switch 317. This is highly desirable but the various holding coils and switches involved can be simplified if desired and a mechanical connection provided so that blade 318 is always in its down position when blade 324 is in its down position and vice versa. In other words, when the platform 292 reaches its downmost position switch blades 318 and 324 are physically moved to their down positions and are maintained in such position until the platform 292 is moved to its highest position. Then both blades 318 and 324 are maintained in their upper positions until the platform 292 reaches its down position and then both are mechanically changed and held through their various positions for each cycle.

Figure 20:
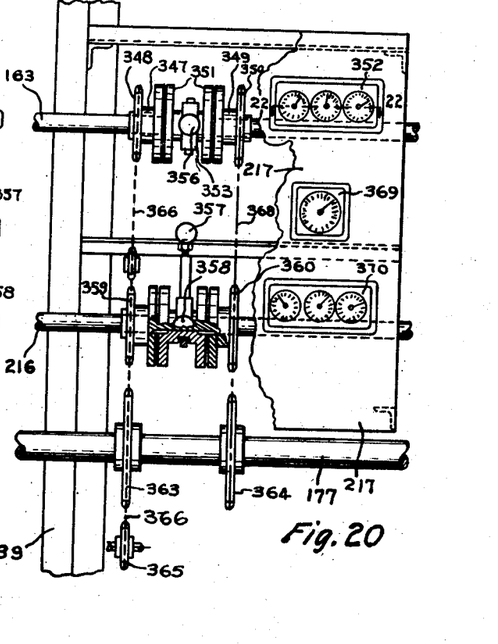
Fig. 20 is a fragmentary elevational view, with parts in section, with parts broken away, and with parts diagrammatically shown, of the control mechanism in housing 217 shown in Figs. 1 and 2.
Figure 21:
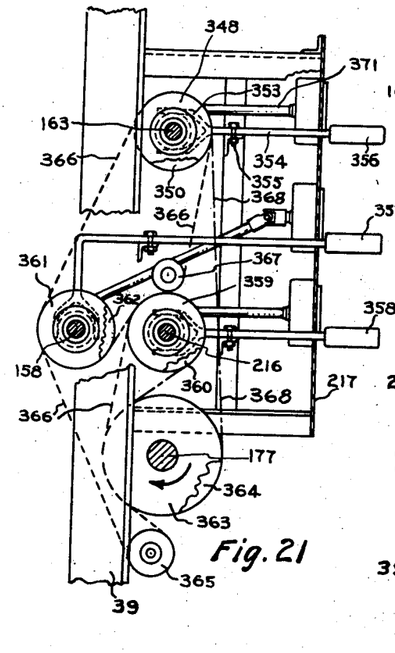
Fig. 21 is a fragmentary side elevational view, with parts in section, with parts broken away, and with parts diagrammatically shown of the structure shown in Fig. 20.

Referring now more particularly to Figs. 20 and 21, shafts 163, 158, 216 and 177 are shown as they enter and leave housing 217. As previously described, shafts 163, 158, and 216 control various parts of the apparatus respectively for the width, thickness, and length of the panels of a particular stack. Upon rotation of said shafts 163, 158, and 216 in the desired direction and in the desired amount, the device can be adjusted to take care of panels of various dimensions. The shaft 177, as previously described, is the main power shaft.

Shaft 163 floatingly mounts clutch part 347 and said clutch part is rigid with a sprocket 348. The shaft 163 also rotatably mounts clutch part 349 which rigidly carries sprocket 350. Intermediate clutch part 351 is splined on shaft 163 and is mounted for longitudinal movement to engage either clutch part 347 or 349. The sprockets 348 and 350 are driven in opposite drections and thus by moving of the clutch part 351 in the desired direction the shaft 163 can be driven in the desired direction. Shaft 163 is geared to dial assembly 352 and the pointers of the dial assembly will thus indicate the amount of rotation of the shaft 163. The dials of said dial assembly 352 can be calibrated so that they will show to feet, inches, and portions thereof, the extent of adjustment which has been made and will indicate that the various parts of the device have been adjusted to take care of a panel of a definite width, such as four feet. The clutch part 351 floatingly carries a yoke 353 carried by a clutch throw-out lever 354. The lever 354 is pivoted to the main structure at 355. The clutch lever 354 is provided with a handle 356 and thus by movement of the lever 354 in one direction shaft 163 will be rotated clockwise and upon movement of the lever 354 in the opposite direction the shaft 163 will be rotated counterclockwise.

The shafts 158 and 216 carry similar clutches and for such reason the clutch parts on shafts 158 and 216 are only in part numbered and only in part further described. Thus clutch handle 357 operates the clutch on shaft 158 and clutch handle 358 operates the clutch on shaft 216. Sprockets 359 and 360 are floatingly mounted on shaft 216 and sprockets 361 and 362 are floatingly mounted on shaft 158. In Fig. 21 a fragment of the sprocket 361 is broken away to show the sprocket 362 in the background. Main power shaft 177 carries sprockets 363 and 364. An idler sprocket 365 is carried by the main frame structure 39 of the machine.

Main power shaft 177 is driven continuously in one direction, such as clockwise, as viewed in Fig. 21 of the drawings. A chain 366 is carried by sprockets 348, 361, 365, 363, 359, and 367 and said chain is indicated by a dash line. The reeving of said chain commencing with sprockets 363 is in a clockwise direction with a bight of the chain engaging the sprocket 363, thence to and in a clockwise direction about sprocket 359; thence to and in a counterclockwise direction about an idler sprocket 367; thence to and in a counterclockwise direction about the sprocket 348; thence to and in a counterclockwise direction about the sprocket 361; thence to and in a counterclockwise direction about the idler sprocket 365; and thence to and in a clockwise direction about the first mentioned sprocket 363. From the foregoing it will appear that if the shaft 163 is connected to the main power shaft 177 by chain 366 said shaft 163 will be moved in a counterclockwise direction. Also it will appear that if the shaft 158 is connected with the main power shaft 177 by chain 366, said shaft 158 will be moved in a counterclockwise direction. Also if shaft 216 is connected to the main power shaft 177 by chain 366, said shaft 216 will be driven in a clockwise direction.

Chain 368 is reeved about sprocket 350 on shaft 163, sprocket 362 on shaft 158, sprocket 360 on shaft 216, and sprocket 364 on shaft 177. The reeving of said chain 368 commencing with sprocket 364 may be described as passing around sprocket 364 in a clockwise direction; thence to and around sprocket 360 in a counterclockwise direction; thence to and around sprocket 362 in a clockwise direction; thence to and around sprocket 350 in a clockwise direction; and thence directly to and around sprocket 364 (the sprocket first mentioned) in a clockwise direction. Thus if shaft 216 is connected with main power shaft 177 via chain 368, the same will be driven in a counterclockwise direction. If shaft 158 is connected to main power shaft 177 by chain 368, shaft 158 will be driven in a clockwise direction. If shaft 163 is connected to main power shaft 177 by chain 368, said shaft 163 will be driven in a clockwise direction. Upon proper manipulation of the handles 356, 357, or 358, the shafts 163, 158 and 216 can be driven in the desired direction and to the desired extent. The desired extent of movement of said shafts will be indicated respectively by the dial assemblies 352, 369 and 370. The dial assemblies 352 and 370 will indicate respectively the width or the length of a panel for which the machine has been adjusted and hence a dial assembly having multiple pointers is preferable so feet, inches and portions of an inch can be readily indicated. On the other hand, the dial 369 merely indicates fractions of an inch to which the machine has been adjusted to accommodate panels of different thicknesses and hence a single pointer dial is sufficient for the dial assembly 369. The dial assemblies 352, 369 and 370 are connected in any suitable manner with the respective shafts 163, 158, and 216 as by gearing.

Figure 22:
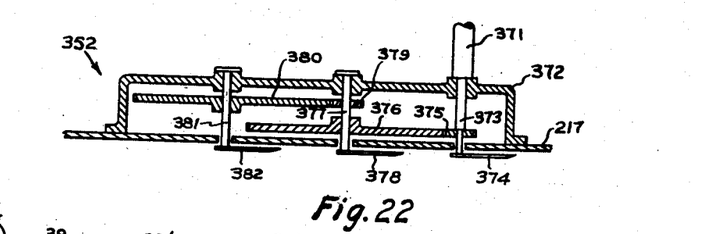
Fig. 22 is a sectional view, on a larger scale than Fig. 20, and taken substantially on broken line 22—22 of Fig. 20.

The dial assemblies 352 and 370 may be duplicates and one thereof, as 352, as indicated in Fig. 22. The shaft 371 (see also Fig. 21) is geared to shaft 163 and is rotatably mounted in the dial housing 372 and carries rotatably mounted shaft 373 bearing indicating hand 374. Shaft 373 rigidly carries gear 375 which meshes with a suitable reduction gear 376 mounted on shaft 377 which is rotatably mounted in the dial housing 372. Shaft 377 carries dial pointer 378. Gear 379 is mounted on shaft 377 and meshes with suitable reduction gear 380 rigid on shaft 381, which shaft 381 is rotatably mounted in dial housing 372. Shaft 381 carries dial pointer 382. With the provision of suitable reduction gears dial pointer 382 will read in feet on a suitably calibrated dial face, 378 may read in inches, and dial pointer 374 in portions of an inch, such as sixteenths.

In a summary way, in my invention the elevator platform 42 of the elevator 25 will start from its lowermost position. In such position a stack of panels 40 is rolled into place over rolls 41. Then motor 182 (which drives the various conveyors and control mechanism for dimensions) is energized. Also, main switch 309 to the stacker motor 304 is closed. Next, a switch (not shown) is closed to energize conductors 92, 93 and 94 which are in the electrical circuit to motor 61 for elevator 25. Also, energy is provided on slip rings 203 to energize transformer 202 and thus heat the branding elements 204 of branders 30 and 35.

If the stack of panels comprises panels 4' x 8' x ⅝" then control levers 356, 358, and 357 (Fig. 21) are manipulated so that the various parts of the apparatus are set to take care of panels of such dimensions. In this connection there must be an adjustment of the kicker 26 to take care of a given width panel. There must be an adjustment of the plate 117 (Fig. 8) to take care of thickness so that all panels except the top panel are restrained from being ejected from elevator 25. There must be an adjustment in the first brander 30 so that the branders thereof are spaced apart to accommodate a panel of a predetermined length. Also preferably the branders in such first brander 30 are adjusted so they will brand centrally or at an adjusted position vertically considered for panels of a given thickness. Next, there must be an adjustment in the direction changer 32 so that the stop bar 245 is adjusted for a panel of a predetermined width. Next, there must be an adjustment in the second brander 35 so that the brander heads in said brander will take care of panels of a predetermined width and preferably of a predetermined thickness as set forth in connection with the first brander 30. Next, there must be an adjustment of the stop 230 so that panels will be properly alined and stacked in the stacker 37. As before indicated all of these adjustments are made by manipulating of the handles 356, 357, and 358 (Figs. 20 and 21).

After all parts have thus been rapidly adjusted, the switch 100 (Fig. 11) can be momentarily closed and the elevator platform 42 will start to rise. The kickers 26 are mechanically linked to the motor 182 which is the common source of power and thus they will reciprocate in timed sequence. Plywood panels, as commonly produced on the market, vary somewhat in thickness and the accumulated variation over a four foot stack of panels often runs into approximately a half inch. Thus to compensate for this variation the elevator platform 42 must be controlled from the position of the top panel so there will always be a panel available to be ejected from the stack by the kickers 26. In addition the plate 117 (Fig. 8) is carried by rolls which float on the top of the stack of panels and thus I have provided for precise limiting means which will positively prevent ejection of more than one panel at a time from the stack and into the squeeze rolls 27.

As the chain conveyor 28 is mechanically linked to the common source of power, the chain conveyor 28 will be synchronized with the kickers 26. Thus each panel which is delivered by the squeeze rolls 27 to the chain conveyor 28 will be delivered just in advance of a set of cleats or lugs 29. As the rotating branders of the first brander 30 are mechanically linked to the common source of power, the position (longitudinally considered) of the brands on the end edges of a panel will bear a definite relation to the trailing end edge of a panel regardless of the width of panel.

Panels from the first brander 30 are delivered via squeeze rolls 31 to the direction changer 32 and just in advance of traveling slats 34. The traveling slats 34 are also mechanically linked to the common source of power and thus there will always be a slat 34 to engage behind each panel which is delivered to the direction changer 32.

As the slats 34 advance a panel past the branders of second brander 35 there will be a definite relation (longitudinally considered) between the brands on the side edges of a panel and the trailing side end of a panel as the branders of the second brander 35 are mechanically linked to the common source of power.

Panels leaving the second brander 35 can be delivered to any suitable location and are preferably delivered to the stacker 37 which operates automatically through a cycle to receive one stack of panels. As the normal position of the stacker at the end of its cycle is in a down position, of course the switch 315 (Fig. 23) should be momentarily closed before panels are permitted to pass through the machine so that the stacker platform will be in an upper position. As panels are delivered to the stacker 37, the stacker will automatically periodically lower in response to incoming panels thereon.

After the panels have been exhausted from the elevator 25, the elevator 25 will automatically move to a down position and preferably move downwardly under control of a brake, rather than under control of a motor, to provide for rapid descent. The elevator 25 completes its cycle when the elevator 25 is down so it can be safely loaded. The platform 292 of the stacker 37 at the end of its cycle is at the bottom position to permit safe unloading of a stack of panels from the stacker 37. Obviously, the switch 315 (Fig. 23) controlling the stacker 37 should always be closed momentarily first before the switch 100 (Fig. 11) controlling the elevator 25 is closed.

Obviously, changes may be made in the dimensions, arrangements, and parts of my invention without departing from the principle thereof, the above setting forth only preferred forms of embodiment of my invention.

I claim:

A device for branding plywood panels of different dimensions comprising spaced apart rotatable brander head means; horizontally adjustable brander head supporting means supporting both said brander head means for relative movement toward and away from each other to thereby accommodate panels of different dimensions, as width, in their direction of travel between said brander head means; transfer means for conveying said panels past, between and in side edge contact with both said brander head means; second spaced apart rotatable brander head means; second horizontally adjustable brander head supporting means supporting both said second brander head means for relative movement toward and away from each other to thereby accommodate panels of different dimensions, as length, in their direction of travel between said second brander head means; and second transfer means for changing the direction of travel of said panels and conveying said panels past, between and in end edge contact with both said second brander head means.

DALE L. SCHUBERT.

References Cited in the file of this patent

UNITED STATES PATENTS

| Number | Name | Date |
|---|---|---|
| 368,253 | Swift | Aug. 16, 1887 |
| 1,288,082 | McDonough | Dec. 17, 1918 |
| 1,288,083 | McDonough | Dec. 17, 1918 |
| 1,288,084 | McDonough | Dec. 17, 1918 |
| 1,351,777 | McDonough | Sept. 7, 1920 |
| 1,367,066 | McDonough | Feb. 1, 1921 |
| 1,389,244 | Free | Aug. 30, 1921 |
| 1,511,714 | Beadle | Oct. 14, 1924 |
| 1,581,583 | Low | Apr. 20, 1926 |
| 1,677,927 | Pettee | July 24, 1928 |
| 1,845,726 | Scott | Feb. 16, 1932 |
| 1,886,564 | Lunden | Nov. 8, 1932 |
| 1,953,049 | Horton | Mar. 27, 1934 |
| 2,202,110 | Maurer | May 28, 1940 |
| 2,240,424 | Spiess | Apr. 29, 1941 |
| 2,381,743 | Harred | Aug. 7, 1945 |